(12) United States Patent
Shinkai et al.

(10) Patent No.: US 11,588,720 B2
(45) Date of Patent: Feb. 21, 2023

(54) NETWORK DEVICE AND NETWORK TEST METHOD

(71) Applicant: Nippon Telegraph and Telephone Corporation, Tokyo (JP)

(72) Inventors: Masaki Shinkai, Tokyo (JP); Genichi Nishio, Tokyo (JP); Katsuhiro Araya, Tokyo (JP); Masafumi Ando, Tokyo (JP); Hirokazu Kobayashi, Tokyo (JP); Masumi Sakamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 101 days.

(21) Appl. No.: 17/274,121

(22) PCT Filed: Aug. 27, 2019

(86) PCT No.: PCT/JP2019/033433
§ 371 (c)(1),
(2) Date: Mar. 5, 2021

(87) PCT Pub. No.: WO2020/050095
PCT Pub. Date: Mar. 12, 2020

(65) Prior Publication Data
US 2021/0211370 A1  Jul. 8, 2021

(30) Foreign Application Priority Data
Sep. 7, 2018 (JP) .............................. JP2018-168272

(51) Int. Cl.
*H04L 43/50* (2022.01)
*H04L 41/044* (2022.01)
*H04L 43/0888* (2022.01)

(52) U.S. Cl.
CPC ............ *H04L 43/50* (2013.01); *H04L 41/044* (2013.01); *H04L 43/0888* (2013.01)

(58) Field of Classification Search
None
See application file for complete search history.

(56) References Cited

U.S. PATENT DOCUMENTS

2011/0243029 A1\* 10/2011 Mack-Crane ....... H04L 43/0888
370/253
2012/0113820 A1\* 5/2012 Umayabashi ........... H04L 12/54
370/252

(Continued)

OTHER PUBLICATIONS

[No Author Listed], "ITU-T G.8013/Y.1731—Series G: Transmission Systems and Media, Digital Systems and Networks," Telecommunication Standardization Sector of ITU, Mar. 2018, 102 pages.

(Continued)

*Primary Examiner* — Charles C Jiang
*Assistant Examiner* — Shawn D Miller
(74) *Attorney, Agent, or Firm* — Fish & Richardson P.C.

(57) ABSTRACT

[Problem] To deal with interference in cases where a plurality of business operators perform testing at the same time at different MEG levels.
[Solution] A network device 2 includes a frame distinguishing unit 22*a* that, upon receiving a start instruction for a test from a control device 3, monitors whether or not an OAM frame of a preceding test of a different level from a MEG level of an own device has arrived at the own device, for a predetermined period, and a CPU 24 that, if the frame distinguishing unit 22*a* detects arrival of the OAM frame, and determination is made that its own test will affect the preceding test, notifies the result of the detection and determination.

8 Claims, 5 Drawing Sheets

(56) References Cited

U.S. PATENT DOCUMENTS

| | | | |
|---|---|---|---|
| 2012/0300624 A1* | 11/2012 | Takeyoshi | H04L 47/762 370/230.1 |
| 2014/0071831 A1* | 3/2014 | Sinha | H04L 43/0882 370/241.1 |
| 2016/0048403 A1* | 2/2016 | Bugenhagen | G06F 9/45558 718/1 |

OTHER PUBLICATIONS

[No Author Listed], "JT-Y1731 OAM functions and mechanisms for Ethernet based networks," The Telecommunication Technology Committee, Feb. 24, 2010, 209 pages (with English Translation).

* cited by examiner

Fig. 3

| CLASSIFICATION | OAM FRAME | WHETHER TO BE DETECTED | WHETHER TO STOP |
|---|---|---|---|
| FOR FAULT MANAGEMENT | ETH-CC | NO | NO |
| | ETH-LB | YES | NO |
| | ETH-LT | YES | NO |
| | ETH-AIS | NO | NO |
| | ETH-RDI | NO | NO |
| | ETH-LCK | NO | NO |
| | ETH-Test | YES | YES |
| | ETH-APS | NO | NO |
| | ETH-MCC | NO | NO |
| | ETH-EXP | NO | NO |
| PERFORMANCE MONITORING | ETH-LM | NO | NO |
| | ETH-DM | NO | NO |

NETWORK DEVICE AND NETWORK TEST METHOD

CROSS-REFERENCE TO RELATED APPLICATIONS

This application is a National Stage application under 35 U.S.C. § 371 of International Application No. PCT/JP2019/033433, having an International Filing Date of Aug. 27, 2019, which claims priority to Japanese Application Serial No. 2018-168272, filed on Sep. 7, 2018. The disclosure of the prior application is considered part of the disclosure of this application, and is incorporated in its entirety into this application.

TECHNICAL FIELD

The present invention relates to a network testing method using Ethernet (registered trademark) QAM (Operation Administration Management) frames, and a network device that executes the same.

BACKGROUND ART

In recent years, there is increasing cooperation between telecommunications carriers and SIers (vendors who perform System Integration) and so forth. In accordance with this, there is an increase in situations where a plurality of business operators perform operations on the same line when a fault occurs or the like. Ethernet (registered trademark) OAM frames are often used for maintenance and management of such Ethernet (registered trademark) networks. Hereinafter, Ethernet (registered trademark) OAM may be referred to as "EOAM", or simply as "OAM".

EOAM is a necessary function to operate and maintain networks and services, and is standardized by the ITU-T (International Telecommunication Union-Telecommunication Standardization Sector) as international recommendation "Y.1731" (NPL 1). Further, The Telecommunication Technology Committee has issued a comment on EOAM such as in NPL 2.

CITATION LIST

Non Patent Literature

[NPL 1] TELECOMMUNICATION STANDARDIZATION SECTOR OF ITU, "ITU-T Y.1731", 03/2018
[NPL 2] The Telecommunication Technology Committee, "TTC JT-Y1731 OAM functions and mechanisms for Ethernet based networks", first edition, formulated Feb. 24, 2010

SUMMARY OF THE INVENTION

Technical Problem

Section 5.6, "MEG (Maintenance Entity Group) level" in NPL 2 states that "In case MEGs are nested, the OAM flow of each MEG has to be clearly identifiable and separable from the OAM frames of the other MEGs."

Further, Section 5.7, "OAM Transparency" in NPL 2 states that "OAM Transparency refers to the ability to allow transparent carrying of OAM frames belonging to higher level MEGs across other lower level MEGs when the MEPs are nested." That is to say, in network devices, there is transparency of higher MEG level OAM frames, and the standard does not take into consideration cooperation straddling MEG levels. Accordingly, there is concern that interference may occur between QAM frame of a higher MEG level and QAM frames of a lower MEG level. Specifically, in a case where a plurality of business operators are performing testing at the same time at different MEG levels, frame loss may occur in throughput measurement, and the measurement may be erroneous.

Accordingly, it is an object of the present invention to deal with interference in cases where a plurality of business operators perform testing at the same time at different MEG levels.

Means for Solving the Problem

In order to solve the above problem, an invention according to claim 1 is a network device including a monitoring unit that, upon receiving a start instruction for a test from a control device, monitors whether or not an OAM frame of a preceding test of a different level from a MEG level of an own device has arrived at the own device, for a predetermined period, and a processing unit that, if the monitoring unit detects arrival of the OAM frame, and determination is made that the test will affect the preceding test, the result of the detection and determination is notified.

By doing so, according to the present invention, interference can be dealt with in cases where a plurality of business operators perform testing at the same time at different MEG levels.

An invention according to claim 2 is the network device according to claim 1, wherein the processing unit determines that the test will affect the preceding test if the QAM frame regarding the preceding test is one of ETH-LB, ETH-LT, and ETH-Test.

By doing so, according to the present invention, even if the preceding test is one of ETH-LB, ETH-LT, and ETH-Test, affecting the preceding test can be avoided.

An invention according to claim 3 is the network device according to claim 1, wherein the processing unit stops execution of the test if the preceding test is throughput measurement.

By doing so, according to the present invention, even if the preceding test is throughput measurement, affecting the preceding test can be avoided.

An invention according to claim 4 is the network device according to claim 3, wherein if the monitoring unit detects that an OAM frame of another test of a different level from a MEG level of the own device has arrived at the own device, and the processing unit determines that the test of the own device will affect the other test, the result of the detection and determination is notified.

By doing so, according to the present invention, affecting other tests being performed during testing of the own device can be determined.

An invention according to claim 5 is the network device according to claim 3, wherein if the processing unit detects that an QAM frame of another test of a different level from a MEG level of the own device has arrived during execution of the test, the test is ended.

By doing so, according to the present invention, affecting other tests being performed during testing of the own device can be avoided.

An invention according to claim 6 is a network testing method, wherein a network device having a function of executing a test by an QAM frame monitors, upon receiving a start instruction for a test from a control device, whether or not an OAM frame of a preceding test of a different level from a MEG level of an own device has arrived at the own device, for a predetermined period, and if arrival of the OAM frame is detected, and determination is made that the test will affect the preceding test, the result of the detection and determination is notified.

By doing so, according to the present invention, interference can be dealt with in cases where a plurality of business operators perform testing at the same time at different MEG levels.

An invention according to claim 7 is the network testing method according to claim 6, wherein determination is made that the test will affect the preceding test if the OAM frame regarding the preceding test is one of ETH-LB, ETH-LT, and ETH-Test.

By doing so, according to the present invention, even if the preceding test is one of ETH-LB, ETH-LT, and ETH-Test, affecting the preceding test can be avoided.

An invention according to claim 8 is the network testing method according to claim 6, wherein execution of the test is stopped if the preceding test is throughput measurement.

By doing so, according to the present invention, even if the preceding test is throughput measurement, affecting the preceding test can be avoided.

Effects of the Invention

According to the present invention, interference can be dealt with in cases where a plurality of business operators perform testing at the same time at different MEG levels.

BRIEF DESCRIPTION OF DRAWINGS

FIG. 3 is a diagram illustrating OAM frames and whether or not to perform detection.

DESCRIPTION OF EMBODIMENTS

An embodiment for carrying out the present invention will be described below in detail with reference to the figures.

Corporate Network According to Comparative Example

Figure 5:
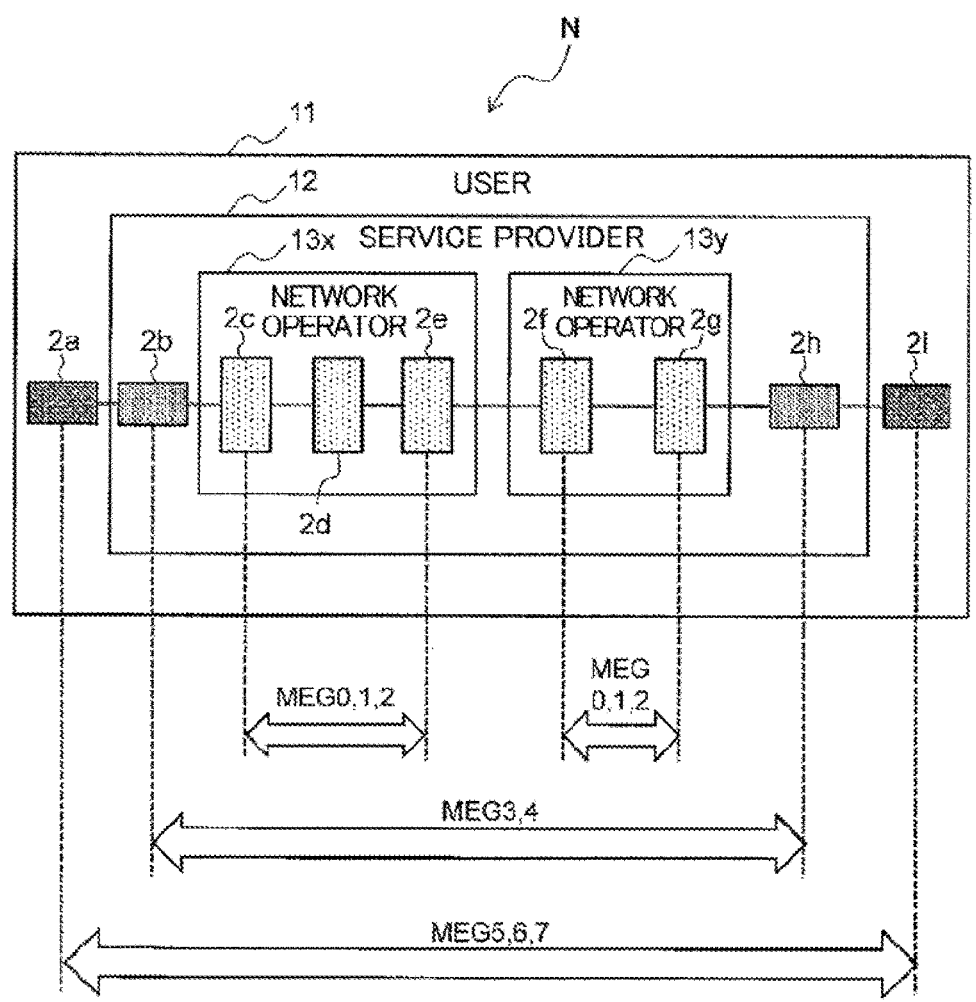
FIG. 5 is a diagram illustrating a configuration of a corporate network.

FIG. 5 is a diagram illustrating a configuration of a corporate network N.

In the corporate network N, lines of network operators 13$x$ and 13$y$ that are telecommunications carriers are provided to a user 11, with service providers 12 that are business operators such as SIers and resellers going in between. The corporate network N is an Ethernet (registered trademark), and accordingly testing commands (OAM) used are divided into seven hierarchical levels. MEG levels 0 to 2 are operators, MEG levels 3 to 4 are providers, and MEG levels 5 to 7 are users.

A user 11 has network devices 2$a$ and 2$i$. The network device 2$a$ is connected to a network device 2$b$ of the service provider 12. The network device 2$i$ is connected to a network device 2$h$ of the service provider 12. MEG level 5 to 7 OAM frames are used for testing between the network device 2$a$ and the network device 2$i$.

The service provider 12 has the network devices 2$b$ and 2$h$. The network device 2$b$ is connected to the network device 2$a$ of the user 11 and a network device 2$c$ of the network operator 13$x$. The network device 2$h$ is connected to the network device 2$i$ of the user 11 and a network device 2$g$ of the network operator 13$y$. MEG level 3 to 4 OAM frames are used for testing between the network devices 2$b$ and 2$h$.

The network operator 13$x$ has network devices 2$c$, 2$d$, and 2$e$, which are sequentially connected. The network device 2$e$ is further connected to a network device 2$f$ of the network operator 13$y$. The network device 2$c$ is further connected to the network device 2$b$ of the service provider 12. MEG level 0 to 2 QAM frames are used for testing between the network devices 2$c$, 2$d$, and 2$e$.

The network operator 13$y$ has network devices 2$f$ and 2$g$, which are connected to each other. The network device 2$f$ is further connected to the network device 2$e$ of the network operator 13$x$. The network device 2$g$ is further connected to the network device 2$h$ of the service provider 12. MEG level 0 to 2 OAM frames are used for testing between the network devices 2$f$ and 2$g$.

The domain of the MEG level 0 to 2 network devices 2$c$, 2$d$, and 2$e$, and the domain of the MEG level 0 to 2 network devices 2$f$ and 2$g$ may be adjacent, but do not overlap, as illustrated in FIG. 5.

The network devices 2$c$, 2$d$, and 2$e$ and the network devices 2$f$ and 2$g$ pass therethrough OAM frames of the network devices 2$b$ and 2$h$, which are of a higher MEG level than themselves. The network devices 2$b$ and 2$h$, which are MEG level 3 to 4, discard QAM frames of the network devices 2$c$ to 2$g$, which are of a lower MEG level than themselves.

In the same way, the network devices 2$b$ and 2$h$ and the network devices 2$c$ to 2$g$ pass therethrough QAM frames of the network devices 2$a$ and 2$i$, which are of a higher MEG level than themselves. The network devices 2$a$ and 2$i$, which are MEG level 5 to 7, discard QAM frames of the network devices 2$b$ to 2$h$, which are of a lower MEG level than themselves.

Hereinafter, as cooperation between telecommunications carriers and SIers and so forth increases, it is thought that there will be more situations where a plurality of business operators perform tests on the same line when a fault occurs or the like. When testing is performed at different layers at the same time, a plurality of test will be performed on the same line at the same time.

For example, in a case where the network operator 13$x$ and the service provider 12 perform tests at the same time, the OAM frames that the network devices 2$b$ and 2$h$ transmit/receive pass through the network devices 2$c$, 2$d$, and 2$e$ of the network operator 13$x$. Now, in a case of tests when inoperative such as TST (Test PDU) tests being performed at the same time, traffic exceeding the bandwidth occurs, and accordingly there is concern that both tests will fail, and thus determination of the tests will be erroneous.

Corporate Network According to Present Embodiment

In the format of the present embodiment, confirmation is made regarding whether or not a preceding test is underway at a different MEG level before an own device starts a test, and thereafter the own device inserts an EOAM frame and performs a test. Whether or not a preceding test is underway at a different MEG level is monitored before performing the test with the own device, and accordingly interference with EOAM frames from other tests can be prevented. According to the present embodiment, normal throughput measurement is enabled even in a case where a plurality of business operators perform tests at the same time, and erroneous determination of test results can be eliminated.

Figure 1:
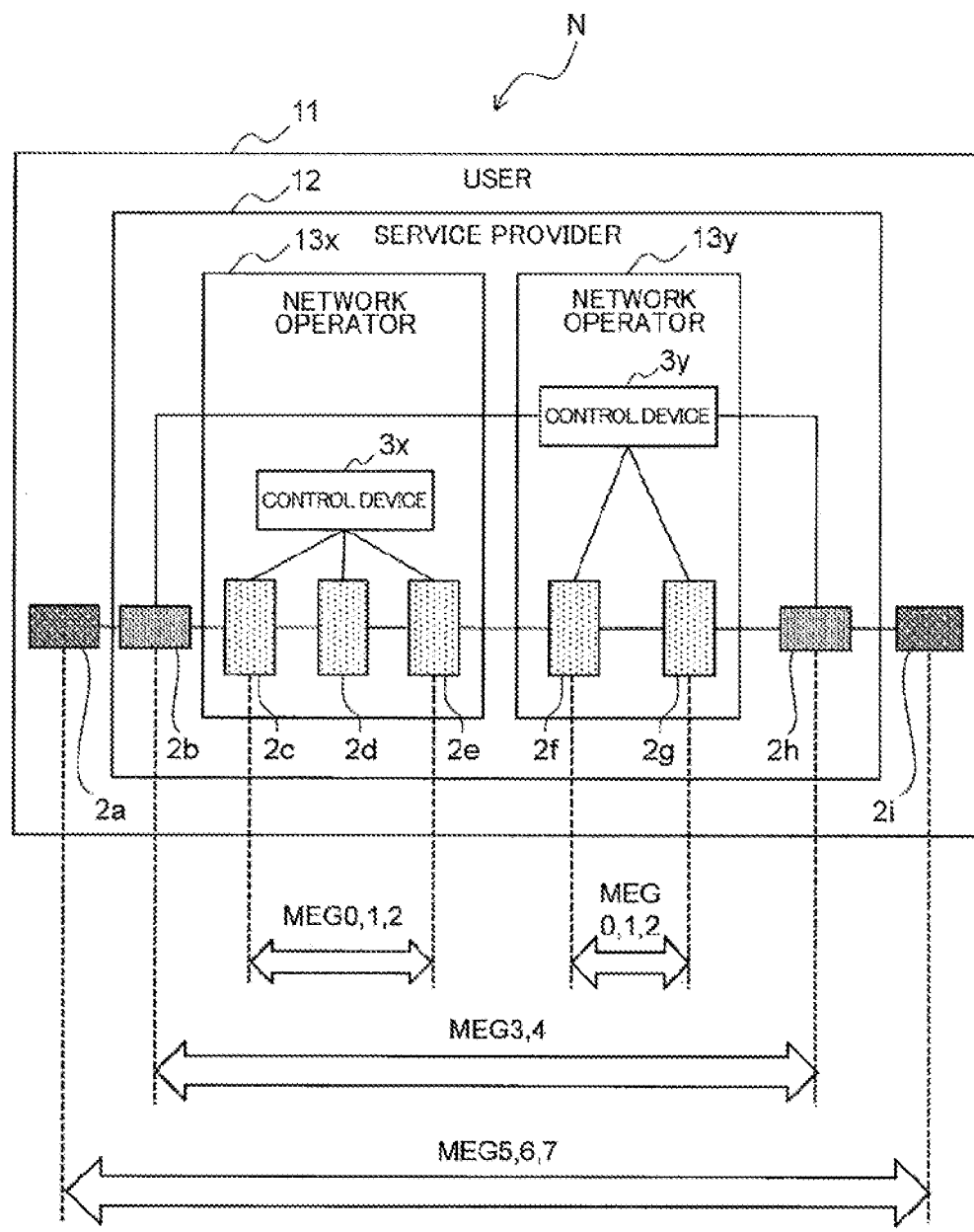
FIG. 1 is a configuration diagram for a corporate network according to the present embodiment.

FIG. 1 is a configuration diagram of the corporate network N according to the present embodiment.

In the corporate network N, lines of the network operators 13x and 13y that are telecommunications carriers are provided to the user 11, with the service providers 12 that are business operators such as SIers and resellers going in between, in the same way as with the comparative example illustrated in FIG. 5. The corporate network N is an Ethernet (registered trademark).

The user 11 has the network devices 2a and 2i. The network device 2a is connected to the network device 2b of the service provider 12. The network device 2i is connected to the network device 2h of the service provider 12. MEG level 5 to 7 OAM frames are used for testing between the network device 2a and the network device 2i.

The service provider 12 has the network devices 2b and 2h. The network device 2b is connected to the network device 2a of the user 11 and the network device 2c of the network operator 13x. The network device 2h is connected to the network device 2i of the user 11 and the network device 2g of the network operator 13y. MEG level 3 to 4 QAM frames are used for testing between the network devices 2b and 2h. The network devices 2b and 2h are each connected to a control device 3y and controlled thereby. The control device 3y here is a control terminal, for a desired GUI (Graphical User Interface) screen to be displayed on a display unit, for example, and an operator to perform input.

The network operator 13x has the network devices 2c, 2d, and 2e, which are sequentially connected. The network device 2e is further connected to the network device 2f of the network operator 13y. The network device 2c is further connected to the network device 2b of the service provider 12.

MEG level 0 to 2 QAM frames are used for testing between the network devices 2c, 2d, and 2e. The network devices 2c, 2d, and 2e are each connected to a control device 3x. The control device 3x is a control terminal, for a desired GUI screen to be displayed on a display unit, for example, and an operator to perform input.

The network operator 13y has the network devices 2f and 2g, which are connected to each other. The network device 2f is further connected to the network device 2e of the network operator 13x. The network device 2g is further connected to the network device 2h of the service provider 12. MEG level 0 to 2 QAM frames are used for testing between the network devices 2f and 2g. The network devices 2f and 2g are each connected to the control device 3y. Hereinafter, when the network devices 2a to 2i are not distinguished, they will be referred to simply as network device 2. When the control devices 3x and 3y are not distinguished, they will be referred to simply as control device 3.

When performing a test from the own device, the network device 2 according to the present embodiment monitors frames flowing through the own device over a predetermined period. When a preceding test is underway and the OAM test planned at the own device might affect the results of the preceding test, the network device 2 notifies the possibility of such an effect to the control device 3 connected to the own device. Note that if the preceding test is throughput measurement, the network device 2 stops its own test.

Figure 2:
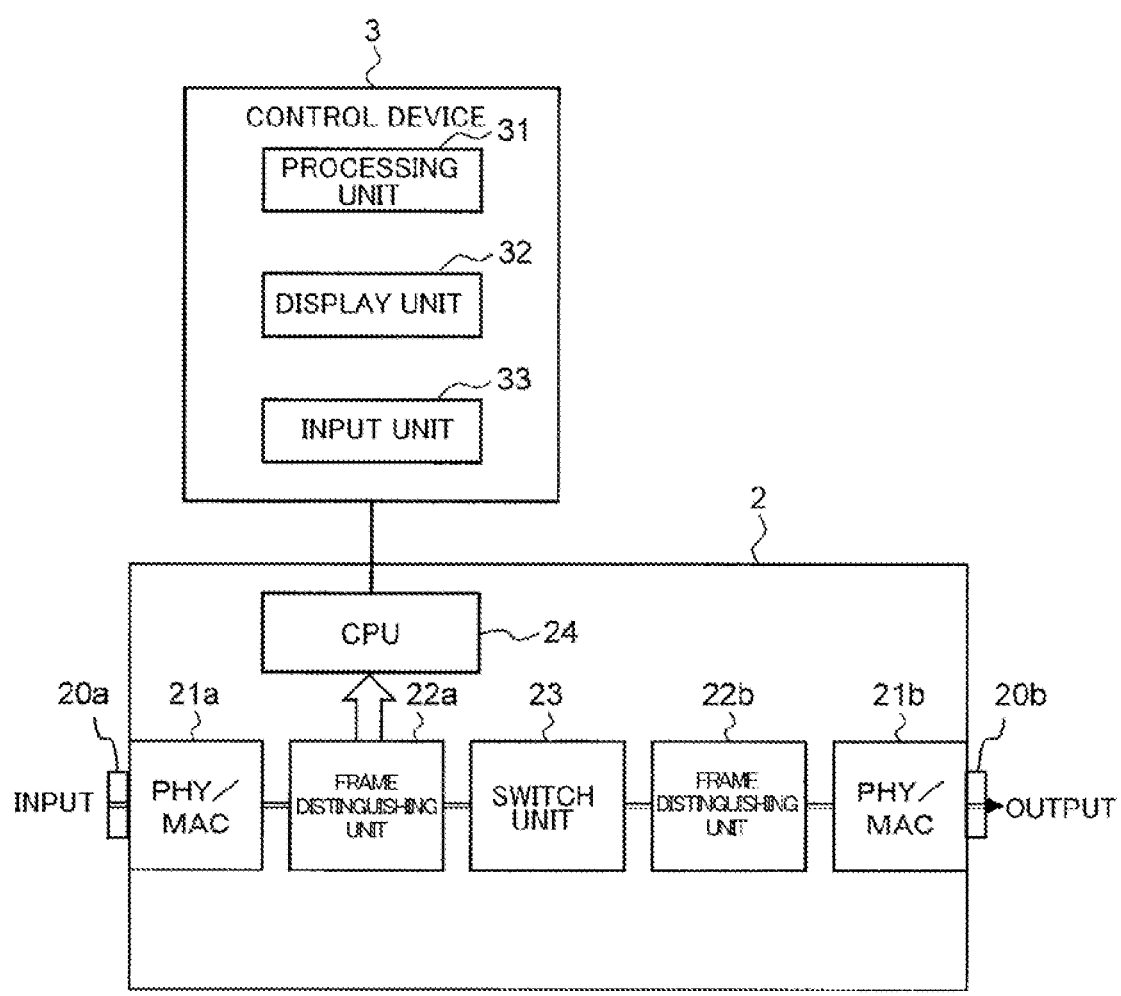
FIG. 2 is a block diagram illustrating a control device and a network device.

FIG. 2 is a block diagram illustrating the control device 3 and the network device 2.

The network device 2 is provided with an input-side port 20a, a PHY/MAC unit 21a and a frame distinguishing unit 22a, a switch unit 23, and a CPU (Central Processing Unit) 24. The network device 2 further is provided with an output-side port 20b, a PHY/MAC unit 21b, and a frame distinguishing unit 22b.

The PHY/MAC unit 21a is connected to the input-side port 20a, and performs termination of the physical layer and the MAC (Media Access Control) layer. One PHY/MAC unit 21a is provided to each physical port, performs conversion among Ethernet physical layer signals and information indicating Ethernet (registered trademark) frames, and performs link establishing processing with other devices, frame distribution processing, and so forth. The PHY/MAC unit 21b is connected to the port 20b, and processes frames input from this port 20b.

The frame distinguishing unit 22a performs priority control and OAM processing regarding frames processed at the PHY/MAC unit 21a. Priority control here means to sort the order of frames according to designated settings. Also, OAM processing means monitoring OAM frames externally arriving, and sending out OAM frames from the own device. The frame distinguishing unit 22b also has the same functions, and performs priority control and OAM processing regarding frames processed at the PHY/MAC unit 21b.

Specifically, in a case of receiving an OAM test command from the control device 3 to perform a test at the own device, the frame distinguishing units 22a and 22b monitor QAM frames of different MEG levels over a predetermined amount of time, and upon confirming that no OAM frames that are the object of test-stopping (see FIG. 3) are flowing, sends an QAM frame including an OAM test command from the own device.

In a case where data transmission processing from a plurality of computers connected to this network device 2 occurs at the same time, the switch unit 23 acts as an exchange to switch transmission destinations of data, to prevent data collision. Thus, the transmission processing capabilities of the corporate network N can be improved.

The CPU 24 is a processing unit that centrally controls this network device 2. Upon the frame distinguishing unit 22a detecting QAM frames relating to a preceding test arriving, and determining that the own test will affect the preceding test, the CPU 24 notifies the result of the detection and determination to the control device 3. Further, if the preceding test is throughput measurement, the CPU 24 stops execution of its own test. This enables interference in cases where a plurality of business operators performing testing at the same time at different MEG levels to be dealt with.

The control device 3 is provided with a processing unit 31 that centrally processes this device, the display unit 32 that displays text, shapes, and so forth, and an input unit 33 that accepts information input by an operator.

The processing unit 31 is configured of a CPU, ROM (Read Only Memory), RAM (Random Access Memory), and a storage unit, for example. Various types of functions of the control device 3 are manifested by the CPU executing a control program stored in the storage unit.

The display unit 32 is configured of a liquid crystal panel or the like, for example. The processing unit 31 notifies the operator of control states by displaying information on the display unit 32.

The input unit 33 is configured of a keyboard, mouse, or the like, for example.

When the operator instructs a test to be started via the input unit 33 for example, the control device 3 transmits an OAM test command to the network device 2.

In a case where OAM test command received from the control device 3 and an Ethernet (registered trademark) frame flowing through the frame distinguishing unit 22a are both QAM frames that are the object of detection, the CPU 24 performs notification to the control device 3 to the effect that a test is underway at a different MEG level. In a case where the OAM frame of a different MEG level is an object of stopping, an input screen regarding whether or not to rerun the test, and wait time thereof, is displayed on the display unit 32 for the operator to perform input to, and the input information is accepted by the input unit 33.

Further, when an OAM frame regarding a test when inoperative arrives from another network device 2 during a test, the control device 3 is notified at the end of the test by making a display on the display unit 32 to the operator, to the effect that there has been a test of a different MEG level during the test. This processing will be described later in detail with reference to FIG. 4.

FIG. 3 is a diagram illustrating QAM frames and whether or not to perform detection.

Of the QAM types, the frame distinguishing units 22a and 22b (see FIG. 2) perform detection regarding ETH-LB, ETH-LT, and ETH-Test, which are QAM frames for tests such as fault search and so forth. ETH-LB here is Ethernet (registered trademark) loopback, which is a function to confirm connection between a MEP and a MIP (MEG Intermediate Point) or a peer MEP.

ETH-LT is Ethernet (registered trademark) link trace, and is a function to acquire an adjacency relationship and a function to evaluate fault points. ETH-Test is often used for throughput measurement. Accordingly, in a case of detecting ETH-Test, QAM testing at the own device is cancelled. ETH-Test is an Ethernet (registered trademark) test signal.

Figure 4:
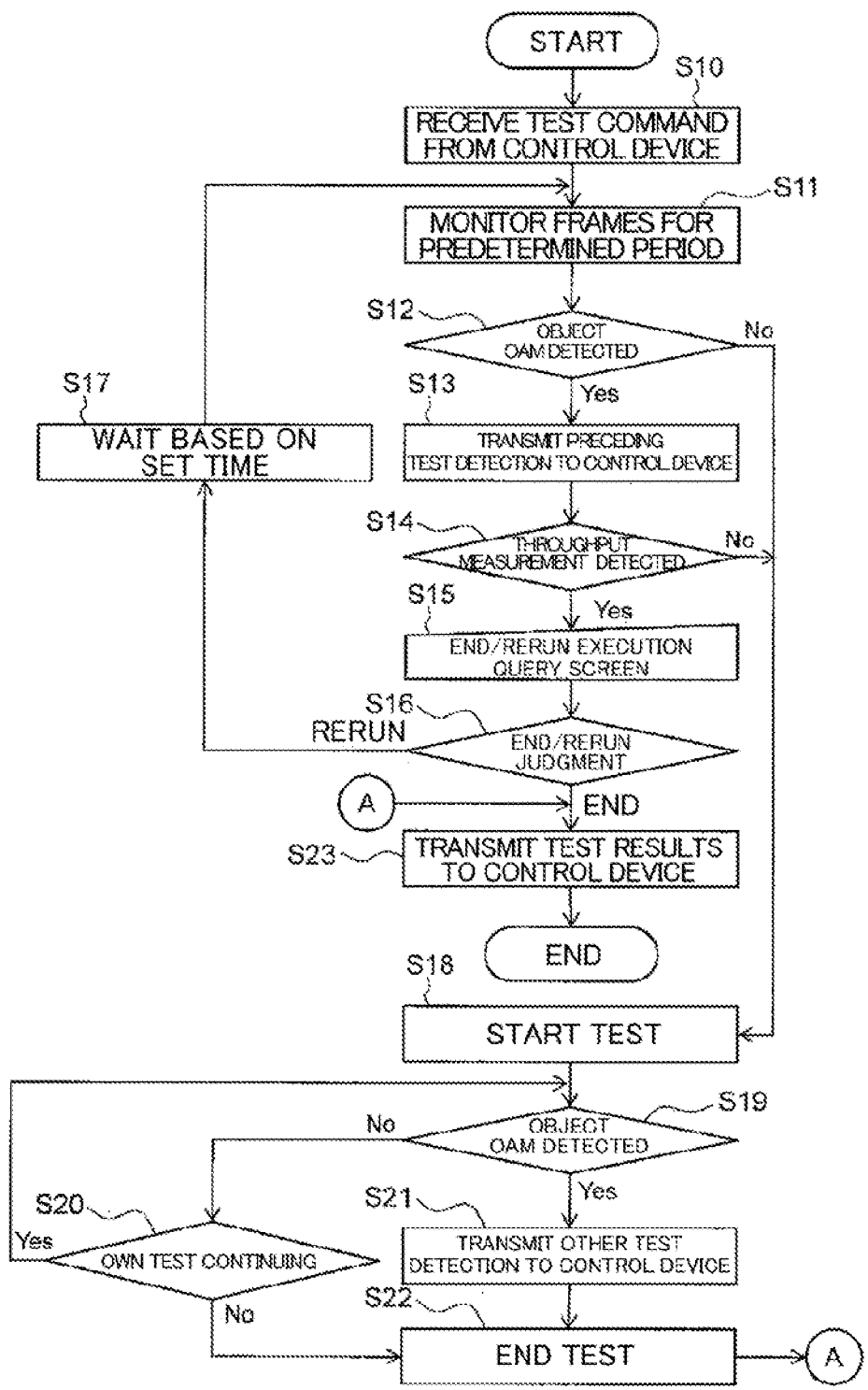
FIG. 4 is a flowchart illustrating network testing processing.

FIG. 4 is a flowchart illustrating network test processing.

First, the network device 2 receives an OAM test command from the control device 3 (S10). This is a command from the control device 3 to carry out the test.

The CPU 24 of the network device 2 monitors frames externally received for a predetermined period by the frame distinguishing unit 22a (S11). In this monitoring, the CPU 24 of the network device 2 determines whether the OAM test command received from the control device 3 and an externally-received QAM frame both are object QAM frames (S12). An object QAM frame here is an OAM frame "to be detected" as illustrated in FIG. 3, and specifically is one of ETH-LB, ETH-LT, and ETH-Test.

If an object OAM frame is detected in step S12 (Yes), the CPU 24 advances to the processing of step S13. If an object QAM frame is not detected (No), the CPU 24 advances to the processing of step S18 and starts the test.

In step S13, the CPU 24 performs transmission to the control device 3 to the effect that a preceding test has been detected underway before the test of the own device. The CPU 24 further determines whether or not the QAM test command received from the control device 3 and the OAM frame externally received both are related to throughput measurement (S14).

In step S14, if the QAM test command and the OAM frame both are throughput measurement (Yes), the CPU 24 advances to the processing of step S15. If at least one of the OAM test command and the OAM frame is other than throughput measurement (No), the CPU 24 advances to the processing of step S18. If the QAM test command and the OAM frame both are ETH-Test here, the CPU 24 determines this to be throughput measurement.

The CPU 24 displays a screen for selecting between ending and rerunning the test of the own device, and inputting a set time until rerunning, on the display unit 32 of the control device 3 (S15), and determines the results of input at the input unit 33 (S16). If rerunning has been input, the CPU 24 performs a wait on the basis of the set time (S17), and returns to the processing of step S11. If ending is input, the CPU 24 transmits test results to the control device 3 (S23) to be displayed on the display unit 32, and ends the processing of FIG. 4.

In step S18, the CPU 24 starts the test of the own device. The CPU 24 determines whether or not an QAM frame that is of a different MEG level and that is an object is detected during the test of the own device (S19). If an OAM frame that is of a different MEG level and that is an object is detected (Yes), the CPU 24 performs transmission to the control device 3 to the effect that another test is detected (S21) to be displayed on the display unit 32, ends the test of the own device (S22), and advances to the processing of step S23.

If an QAM frame that is of a different MEG level and that is an object is not detected (No) in step S19, the CPU 24 advances to the processing of step S20, and determines whether or not the test of the own device is continuing.

In step S20, if the test of the own device is continuing (Yes), the CPU 24 returns to the processing of step S19. If the test of the own device is not continuing (No), the CPU 24 ends the test (S22), transmits test results to the control device 3 (S23) to be displayed on the display unit 32, and ends the processing of FIG. 4.

Modifications

The present invention is not limited to the above embodiments. Various changes may be made without departing from the essence of the present invention, examples of which include the following (a) to (e).

(a) The standard for EOAM that is the object of the present invention may be any of IEEE, ITU-T, MEF, and vendor-unique standards.

(b) The QAM frames according to the present invention include the three of link OAM (IEEE 802.3ah), connectivity OAM (IEEE 802.1ag), and service QAM (IEEE 802.1ag), as objects.

(c) The functions of the control device 3 may be built into one of the network devices 2.

(d) The flowchart illustrated in FIG. 4 may be realized by a control program that the CPU 24 executes, or may be realized by hardware logic, and is not limited.

(e) The destination to which the network device 2 performs transmission to the effect that a preceding test is underway, and performs transmission to the effect that another test is detected, is not limited to the control device 3, and may be any device (terminal).

REFERENCE SIGNS LIST

11 User
12 Service provider
13x Network operator
13y Network operator
2, 2a to 2i Network device
21a, 21b PHY/MAC unit
22a, 22b Frame distinguishing unit (monitoring unit)

23 Switch unit
24 CPU (processing unit)
3, 3x, 3y Control device
31 Processing unit
32 Display unit
33 Input unit

The invention claimed is:

1. A network device, comprising:
a monitoring unit, including one or more processors, that, upon receiving a start instruction for a first test from a control device, monitors whether or not an Operation Administration Management (OAM) frame of a preceding test of a different level from a Maintenance Entity Group (MEG) level of an own device has arrived at the own device, for a predetermined period; and
a processing unit, including one or more processors, that, if the monitoring unit detects arrival of the OAM frame, a determination is made that the first test will affect the preceding test, and a result of the detection and determination is notified; wherein
the processing unit is configured to end the first test in response to detecting that an OAM frame of a second test of a different level from an MEG level of the own device has arrived during execution of the first test.

2. The network device according to claim 1, wherein the processing unit determines that the first test will affect the preceding test if the OAM frame regarding the preceding test is either one of ETH-LB, ETH-LT, and ETH-Test.

3. The network device according to claim 1, wherein the processing unit stops execution of the first test if the preceding test is a throughput measurement.

4. The network device according to claim 3, wherein if the monitoring unit detects that an OAM frame of a second test of a different level from a MEG level of the own device has arrived at the own device, and the processing unit determines that the first test of the own device will affect the second test, a result of the detection and determination is notified.

5. A network testing method comprising:
monitoring, by a network device configured to executing a test by an Operation Administration Management (OAM) frame, upon receiving a start instruction for a test from a control device, whether or not an OAM frame of a preceding test of a different level from a Maintenance Entity Group (MEG) level of an own device has arrived at the own device for a predetermined period;
if arrival of the OAM frame is detected and determination is made that the test will affect the preceding test, notifying a result of the detection and determination; and
ending the first test in response to detecting that an OAM frame of another the second test of a different level from a MEG level of the own device has arrived during execution of the first test.

6. The network testing method according to claim 5, wherein determination is made that the test will affect the preceding test if the OAM frame regarding the preceding test is either one of ETH-LB, ETH-LT, and ETH-Test.

7. The network testing method according to claim 5, wherein execution of the test is stopped if the preceding test is a throughput measurement.

8. The network testing method according to claim 5, further comprising: notifying a result of the detection and determination if the monitoring unit detects that an OAM frame of a second test of a different level from a MEG level of the own device has arrived at the own device, and determining that the first test of the own device will affect the second test.

* * * * *